United States Patent [19]

Langner

[11] 4,421,437
[45] Dec. 20, 1983

[54] CORRUGATED BUCKLE ARRESTOR

[75] Inventor: Carl G. Langner, Houston, Tex.

[73] Assignee: Shell Oil Company, Houston, Tex.

[21] Appl. No.: 162,719

[22] Filed: Jun. 25, 1980

Related U.S. Application Data

[63] Continuation of Ser. No. 970,849, Dec. 19, 1978, abandoned, which is a continuation of Ser. No. 848,847, Nov. 7, 1977.

[51] Int. Cl.³ ............................................... F16L 1/00
[52] U.S. Cl. ..................... 405/166; 405/168; 405/169; 138/122; 138/173
[58] Field of Search ............... 405/154–170; 226/172; 138/121, 173; 29/429; 138/122

[56] References Cited

U.S. PATENT DOCUMENTS

| | | | |
|---|---|---|---|
| 486,986 | 11/1892 | Schinke | 405/170 X |
| 1,652,703 | 12/1927 | Cushman | 405/126 |
| 1,864,861 | 6/1932 | Schaller | 138/122 X |
| 2,308,743 | 1/1943 | Bulkley et al. | 405/198 |
| 2,864,591 | 12/1958 | Frink | 138/122 X |
| 3,011,467 | 12/1961 | Le Tourneau | 405/198 X |
| 3,201,723 | 8/1965 | Martin et al. | 138/122 X |
| 3,266,690 | 8/1966 | Goettsch | 226/172 |
| 3,550,639 | 12/1970 | Okuda | 138/121 |
| 3,680,342 | 8/1972 | Mott et al. | 226/172 X |
| 3,685,306 | 8/1972 | Mott | 405/168 |
| 3,768,269 | 10/1973 | Broussard et al. | 405/168 |
| 3,794,364 | 2/1974 | Williams | 138/173 |
| 3,911,690 | 10/1975 | Gracia | 405/166 |
| 4,003,122 | 1/1977 | Overmyer et al. | 29/429 |
| 4,261,671 | 4/1981 | Langner | 405/158 |

Primary Examiner—Dennis L. Taylor

[57] ABSTRACT

Collapse failures of a pipe wall are prevented from propagating along an underwater pipeline by providing corrugations at intermittent, recurrent, or periodic intervals along the length of the pipeline.

9 Claims, 2 Drawing Figures

CORRUGATED BUCKLE ARRESTOR

This is a continuation of application Ser. No. 970,849, filed Dec. 19, 1978, now abandoned, which in turn is a continuation of application Ser. No. 848,847, filed Nov. 7, 1977.

BACKGROUND OF THE INVENTION

Deepwater offshore pipelines can collapse or buckle in one section, and the collapse or buckle can propagate along the pipeline until it either encounters an obstacle such as a valve body, or until the water depth is substantially decreased. Such collapse or buckle failures may be brought about during construction of the pipeline by ovaling of the pipe, or may be induced after construction and during operation of the pipeline by damage caused by external forces such as dragging ship anchors, mud slides, water-induced movements, or other disturbances. U.S. Pat. No. 3,768,269 provides several means for mitigating propagation collapse failures in pipelines by the use of a buckle arrestor, which is either a collar or ring attached to the pipe, a short thicker section of pipe or nipple, or a metal pig. Each of these means must be attached, affixed, or inserted into and secured to the pipeline, preferably during the laying of the pipeline. The present invention provides an improvement over the invention of that patent.

SUMMARY OF THE INVENTION

The primary purpose of the present invention is to provide a method and means for preventing a collapse or buckle from propagating along an underwater pipeline. This purpose is realized by employing corrugation at intermittent, recurrent, or periodic intervals along the length of the pipeline. Thus, any such propagation collapse failure once started will be confined to a length of pipe between two adjacent arrestors. The distance between arrestors normally is selected to be such that the damaged section may be repaired or replaced conveniently with existing technology. In a preferred embodiment, the corrugated pipe sections are internally lined to provide a smoother, corrosive-free interior surface.

DESCRIPTION OF PREFERRED EMBODIMENTS

Figure 1:
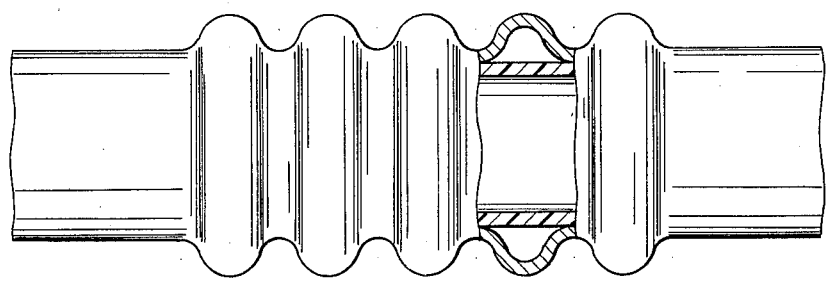
FIG. 1 shows a pipe having a corrugated section with a liner.
Figure 2:
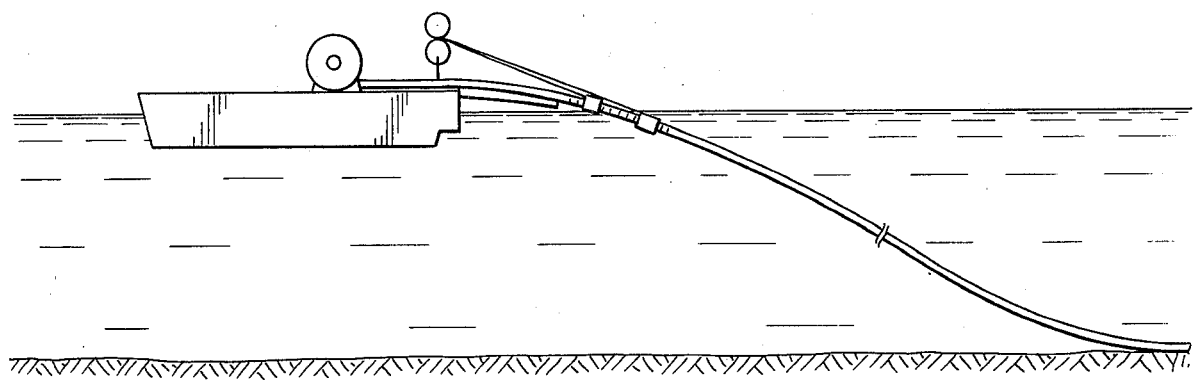
FIG. 2 shows a reel method of pipelaying employing a stinger and tensioning.

The present invention advantageously solves the problem of propagating collapses in underwater pipelines without employment of an add-on means, such as a collar or pig, as described in U.S. Pat. No. 3,768,269. The addition of such add-on means requires an extra step during the pipelaying process, for example welding, which significantly increases pipe handling problems. In accordance with the present invention, the pipe may be provided with a corrugated interval or section formed in situ in the pipe, preferably when the pipe is manufactured. Then, each of the pipes with the corrugated sections can be welded together, thereby forming the pipeline without added pipe handling resulting from the addition of add-on buckle-arresting means.

Corrugated intervals or sections in the pipe may result in greater collection of corrosive fluids in low areas resulting in decreased reliability and cause difficulty in passing of pigs and scrapers. These problems are solved by employing a liner in the corrugated section which may be of plastic or other material, preferably a light material, so as not to add substantially to the weight of the pipe. The liner may be inserted after fabrication of the pipe, or fabricated in situ in the corrugated pipe. Suitable plastics for liners include polyurethane, polyethlene, polypropylene, polyvinyl chloride, and epoxy, either plain or mixed with asphalt.

By a corrugated pipe, it is meant a pipe having the ridges or grooves of a corrugated surface in the walls thereof. Commonly, corrugations in the pipe go alternately from peak to valley to peak to valley, and this term is well-accepted in the art. The corrugations may be essentially circumferential or may spiral about the pipe at a shallow pitch angle up to about 45°. Greater angles than this may enjoy some of the benefits of the invention, but it is clear that essentially longitudinal corrugations would weaken rather than strengthen the pipe. There is some manufacturing advantage in using spiralling corrugations inasmuch as the mandrel forming the pipe may more conveniently be withdrawn from the pipe by a spiraling mode. Also, there may be some advantage in a spiraling corrugation in that the flow of the fluid in the pipe may tend to sweep out some of the fluid in the valleys, especially as the pitch angle increases. Of course, the disadvantages of having corrugations in the pipe may be overcome by the use of liners as above noted.

The corrugations may all be of a substantially uniform size or may be of irregular size; but, it is important that no more than about one diameter of smooth pipe be between the corrugations. An optimal peak-to-valley measure of the corrugations is about one to about three wall thicknesses. The corrugations may also be of a patterned sequence of large and small corrugations and may even comprise large corrugations which are made up of small corrugations.

The corrugated sections in the pipe should be from about one half to two pipe diameter in length and should be spaced from about 40 feet to about 400 feet apart. That is, one section of corrugations per every 40-foot joint of pipe should be more than adequate, whereas one section of corrugations per every ten pipe joints may be too far apart for convenient repair of the damaged section between arrestors.

Benefits of the invention enjoyed most are: (1) relatively low cost due to simplified welding and coating requirements, particularly for large-diameter, thin-wall pipes as employed for VLCC tanker loading and unloading terminals; (2) effective and reliable buckle arresting action plus minimum external corrosion problems, due to continuity of the arrestor as part of the pipe wall; (3) stronger gripping of the pipe on the laybarge, provided that the tensioners are designed to mate directly with the external surface of the corrugations; (4) reduced bending stiffness of the pipe at the corrugations, which may help to ease construction problems and may allow the finished pipelines to better follow the contours of the seabottom; and (5) reduced tensile stiffness which should ease axial stress problems due to such factors as temperature fluctuations and rigid end connections, et cetera.

The usual means for laying an offshore pipeline is a floating vessel called a laybarge upon which individual pipe joints are connected together in a series, usually by welding, and then are launched in the water at the vessel stern. The pipe assembly way on the laybarge may be essentially horizontal, as for the "conventional" laybarge, or it may be inclined or essentially vertical, as in a drilling vessel. Another means of a laying pipe is the reel barge or reel ship, which are vessels upon which pipe is stored by winding onto a large reel or spool. At the time of pipelaying, the pipe is unwound from the reel and is lowered to bottom over the vessel stern at a relatively high speed.

For the conventional laybarge, an elongated pipe support structure, commonly called a stinger, is necessary to avoid unnecessary bending and possibly buckling of the pipe in the overbend region. Some form of stinger may also be used in conjunction with the vertical lay method and with the reel method of pipelaying. Tension is applied to the pipeline during laying by means of a tension machine mounted on the deck of the layvessel. Tension prevents the pipe from slipping overboard. Tension in excess of the pipe dead weight controls the curvature of the pipe in the sagbend region and thus prevents buckling of the pipe near the sea bottom.

What is claimed is:

1. An underwater pipeline which is resistant to collapse via a propagating buckle comprising essentially uniform cylindrical pipe having integral corrugated section means along the length of the pipeline at predetermined intervals, the corrugated section means being substantially more resistant to collapse than the pipe and functionable to arrest or prevent a propagating buckle.

2. The pipeline of claim 1 wherein the corrugations run essentially circumferentially about the pipe.

3. The pipeline of claim 1 wherein the corrugations run spirally about the pipe.

4. The pipeline of claim 3 wherein the spiral has a pitch angle up to about 45°.

5. The pipeline of claim 1 wherein a liner is provided inside the corrugations.

6. The pipeline of claim 1 wherein the peak-to-valley measure of the corrugations is about one to about three wall thicknesses of the pipe.

7. The pipeline of claim 1 wherein the number of corrugations at one section varys from about 1 to about 20.

8. A method for laying an underwater pipeline from a vessel comprising, providing a pipeline having integral corrugations at intervals along the length thereof which prevent a collapse from propagating along the pipeline during and after deployment, gripping the pipeline with tensioners which mate directly with the corrugations of the pipeline and tensioning the pipeline with the tensioners during deployment of the pipeline from the vessel, whereby collapse of the pipeline is prevented both by the tensioning and by the corrugations which facilitate tensioning.

9. A method for laying an underwater pipeline from a reel onboard a vessel comprising, providing a pipeline with integral corrugations at intervals along the length thereof, winding the pipeline about the reel, the corrugations functioning to prevent a collapse from propagating along the pipeline during and after deployment, and deploying the pipeline from the reel and vessel to an underwater location.

* * * * *